No. 615,562. Patented Dec. 6, 1898.
M. J. LAWLER.
MOUSE TRAP.
(Application filed Apr. 8, 1898.)

(No Model.)

WITNESSES

INVENTOR
Miles J. Lawler
by Herbert W. T. Jenner.
Attorney

UNITED STATES PATENT OFFICE.

MILES J. LAWLER, OF PARNELL, IOWA.

MOUSE-TRAP.

SPECIFICATION forming part of Letters Patent No. 615,562, dated December 6, 1898.

Application filed April 8, 1898. Serial No. 676,936. (No model.)

*To all whom it may concern:*

Be it known that I, MILES J. LAWLER, a citizen of the United States, residing at Parnell, in the county of Iowa and State of Iowa, have invented certain new and useful Improvements in Mouse-Traps; and I do hereby declare the following to be a full, clear, and exact description of the invention, such as will enable others skilled in the art to which it appertains to make and use the same.

This invention relates to mouse-traps; and it consists in the novel construction and combination of the parts hereinafter fully described and claimed.

Figure 1:
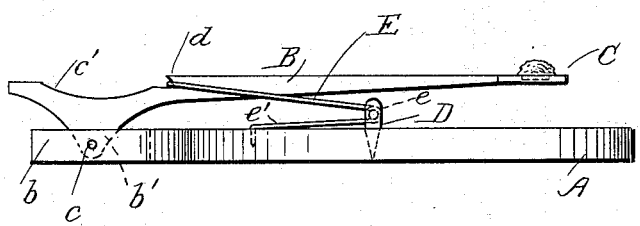
Figure 2:
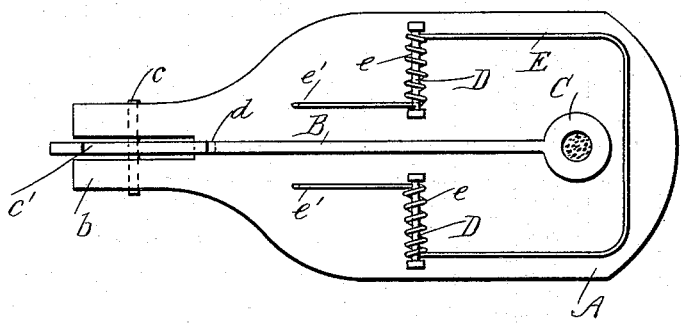

In the drawings, Figure 1 is a side view of the trap, showing it set. Fig. 2 is a plan view of the trap, showing it unset.

A is a base-plate, which is made narrow at one end, so as to form a forked jaw $b$.

B is a trigger-lever provided with a downwardly-projecting lug $b'$ near its rear end, and $c$ is a pivot-pin which pivots the lug $b'$ in the forked jaw $b$. The lever B is provided with a finger-piece $c'$, which projects rearwardly of the pin $c$, so that the front end of the lever can be raised by pressing downward on the part $c'$.

C is a bait-holder, of any approved construction, at the front end of the lever B.

An inclined catch $d$ is formed on the upper part of the lever B a short distance in front of the pivot-pin.

D are two staples driven into the base-plate, one on each side of the lever B and crosswise of its length.

E is a spring-loop formed of wire and having spring-coils $e$ near its ends. The spring-coils $e$ are wound upon the staples before the latter are secured to the base-plate. The ends $e'$ of the loop are secured to the base-plate, as shown in Fig. 2, by the spring-coils.

The trap is set by turning back the loop into engagement with the catch of the trigger-lever, as shown in Fig. 1.

The trap is sprung by the mouse, which depresses the lever in trying to get the bait, and the mouse is then caught between the loop and the base-plate.

The peculiar shape of the base-plate, with the narrow forked jaw at one end, makes the trap very easy to set. The forked jaw can be grasped between the thumb and second finger of the left hand, and the front end of the lever can be raised by pressing downward with the first finger of the left hand upon the finger-piece. This leaves the right hand free to turn back the spring-loop into engagement with the projection or catch $d$ and the loop will not slip and catch the fingers while the trip is being set.

What I claim is—

1. In a trap, the combination, with a base-plate, of a trigger-lever pivoted to the said plate and provided with a finger-piece projecting rearwardly of its pivot and a catch on its upper side a short distance above and in front of its pivot, staples secured to the base-plate one on each side of the middle part of the said lever, and a wire loop provided with spring-coils which are wound on the said staples, the said loop being arranged to engage with the said catch when the trap is set and to strike the base-plate in front of the free end of the trigger-lever when the trap is sprung, substantially as set forth.

2. In a trap, the combination, with a base-plate, and a trigger-lever pivoted to the said plate and provided with a finger-piece projecting rearwardly of its pivot and a catch on its upper side a short distance above and in front of its pivot, of a spring-operated wire loop supported by the said base-plate below the middle part of the trigger-lever, said loop being arranged to engage with the said catch when the trap is set and to strike the base-plate in front of the free end of the trigger-lever when the trap is sprung, substantially as set forth.

In testimony whereof I affix my signature in presence of two witnesses.

MILES J. LAWLER.

Witnesses:
M. CALLAN, Jr.,
W. M. MULLIN.